United States Patent [19]

Pommerening et al.

[11] 4,011,517
[45] Mar. 8, 1977

[54] TIMER APPARATUS FOR INCREMENTING TIMING CODE AT VARIABLE CLOCK RATES

[75] Inventors: Uwe A. Pommerening, Webster; Glenn L. Richards, Caledonia, both of N.Y.

[73] Assignee: Stromberg-Carlson Corporation, Rochester, N.Y.

[22] Filed: Jan. 22, 1975

[21] Appl. No.: 542,947

[52] U.S. Cl. .................. 328/130; 307/269; 307/293; 328/119; 328/63; 328/75; 328/137
[51] Int. Cl.² ............ H03K 1/17; H03K 13/00; G01R 29/02; H03K 5/00
[58] Field of Search ............ 328/63, 72–75, 328/129, 130, 119, 137; 307/269, 293

[56] References Cited
UNITED STATES PATENTS

| | | | |
|---|---|---|---|
| 3,290,606 | 12/1966 | Rodner | 328/119 |
| 3,605,026 | 9/1971 | Bowden | 328/63 |
| 3,764,992 | 10/1973 | Milne | 328/63 |
| 3,932,816 | 1/1976 | MacGregor | 328/63 |

Primary Examiner—Stanley D. Miller, Jr.
Attorney, Agent, or Firm—Donald R. Antonelli; William F. Porter, Jr.

[57] ABSTRACT

A timer circuit receives a multi-bit digital signal representative of a timing code to be incremented. In dependence upon the coded value of the received signal, the code represented by the signal will be incremented at a selected clock rate. The clock rate selected may be chosen to decrease in frequency in a stepwise manner as the code is incremented. As the timing interval increases, the percent resolution of the timing code is maintained substantially constant.

9 Claims, 7 Drawing Figures

TIMER APPARATUS FOR INCREMENTING TIMING CODE AT VARIABLE CLOCK RATES

BACKGROUND OF THE INVENTION

1. Field of the Invention

The present invention relates to a timer, particularly one adapted for use where multiplexed mode timing signals are required. The timer is adapted to progressively increment its timing code in a non-linear, particularly a logarithmic manner over a prescribed time interval, so as to maintain the percent resolution of the timing code substantially constant throughout the interval.

2. Description of the Prior Art

In conventional timing systems, wherein timing signals are employed for controlling a plurality of operations of a general control system, such as the common control in a present day telephone system, counter chains are normally provided in a cascaded fashion to count down signals from one or more clock sources and distribute the divided clock signals throughout the system as needed. With this type of system, however, a considerable amount of active storage and dividing circuitry, such as flip-flops, is necessary in order to maintain the percent resolution of the timing signals fairly constant throughout the maximum time interval involved in carrying out a system control function.

BRIEF SUMMARY OF THE INVENTION

In accordance with the present invention, in place of the typical counting chain of divider circuits, combinational logic is employed so as to reduce the number of bits required for maintaining the desired percent resolution throughout the timing interval substantially constant. Furthermore, in accordance with the present invention, the timing code is varied in a logarithmic fashion so that during those initial instances of time where fairly short period pulses are required, the timer is capable of providing the same, yet during portions of the overall time interval when high frequency clock pulses are not necessary, but rather a slower counting code can be employed, by virtue of the logarithmic code incrementation, the same percent resolution can be maintained.

The timer circuit of the present invention is particularly adaptable for use in a telephone system, wherein during the initial set up of the call, during which a plurality of events are carried out on a substantially short period of time, a high frequency counting rate is necessary. Yet, as the establishment of the call progresses and a communication path is provided, control functions can be carried out at a slower clocking rate. To this end, the present invention is particularly adapted for use as the timer portion of the common control employed in the electronic private automatic branch exchange telephone system described in our co pending application Ser. No. 431,928 entitled MATRIX-PBX filed Jan. 9, 1974, and assigned to the assignee of the present application. In this system, an incremented counting code is employed for call control purposes.

DETAILED DESCRIPTION

Figure 1:
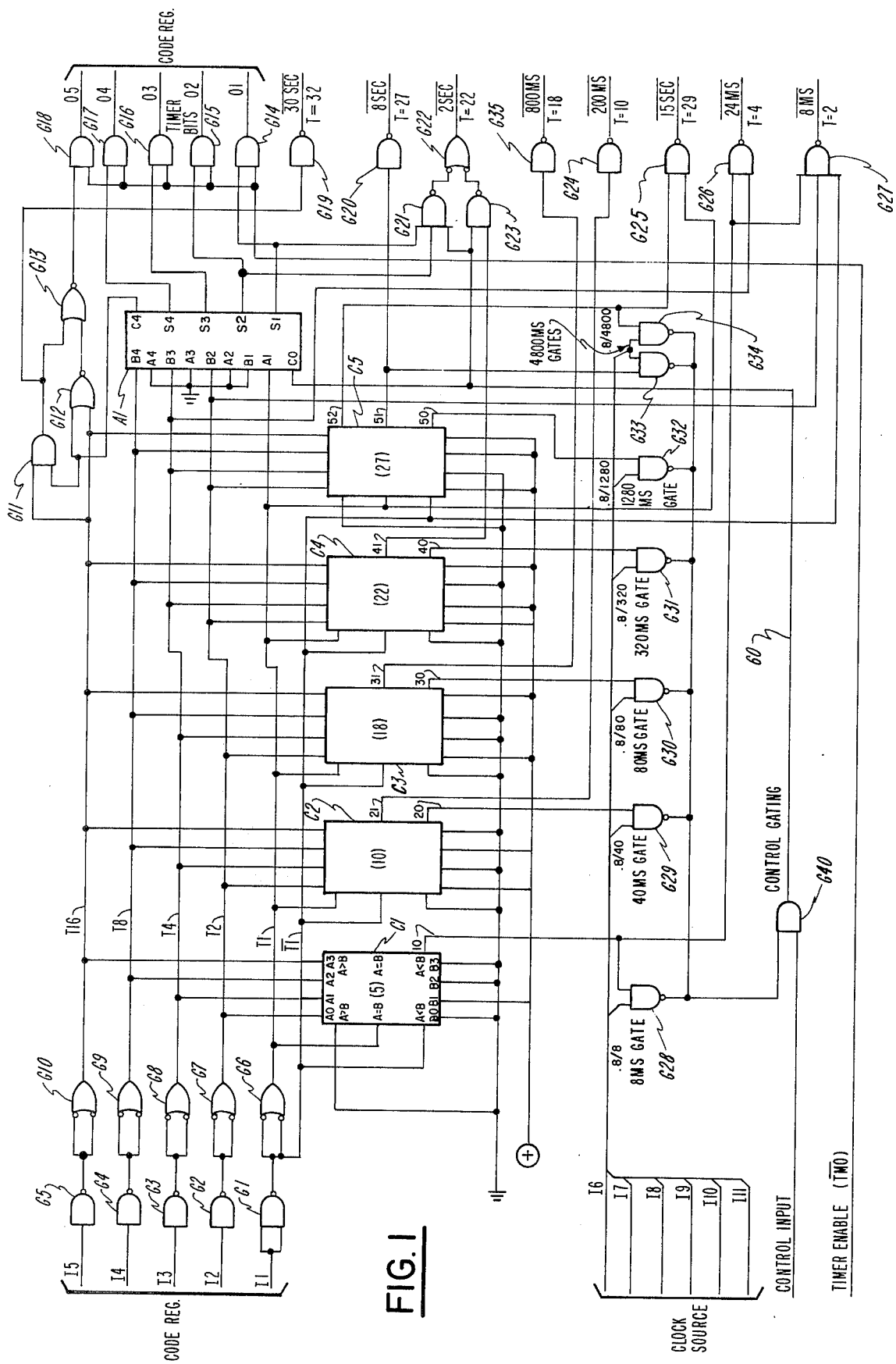
FIG. 1 is a logic circuit diagram of the timer in accordance with an embodiment of the present invention.

In FIG. 1 there are depicted plural comparator circuits C1 – C5, each of which detects a five bit digital timing code. Of course, the number of bits employed may be more or less than five; however, for illustrative purposes, a five bit code has been shown in view of the adaptability of the present invention to the above-referred to electronic private automatic branch exchange telephone system wherein a five bit code is employed. At the input to the system are respective lines I1 – I5 which come from a code register within the control system employing the timing signals which stores the timing code. In the above-referred to telephone system, the timing code information is stored within the junctor memory. At the output of the system, output lines 01 – 05 supply the timing code which has been operated on by the timer shown in FIG. 1 and is supplied again to the code register. It should be remembered here that the system is adapted to operate in a multiplexed mode so that for each time slot a timing code from a different source will be received in the timer operated on and returned to the code register.

In addition to the timing code received at the inputs to gates G1 – G5 on lines I1 – I5, respectively, a plurality of clock signals at different respective frequencies are received over input lines I6 – I11. For generating these clock signals, typically, a four Megahertz crystal oscillator connected to a divider chain is employed to produce respective clock signals of differing but constant frequencies. Thus, over line I6 there will be supplied a clock signal at the indicated 0.8/8 ms rate delivered to one input of the 8 ms gate G28. Over line I7, a clock frequency at a slower rate (0.8/40 ms), namely 1/5 of that of the clock signal on line I6, is supplied to one of the inputs of the 40 ms gate G29. Similarly, the clock signals on the other inputs I8 – I11 are supplied to respective inputs of gates G30 – G34.

Figure 2:
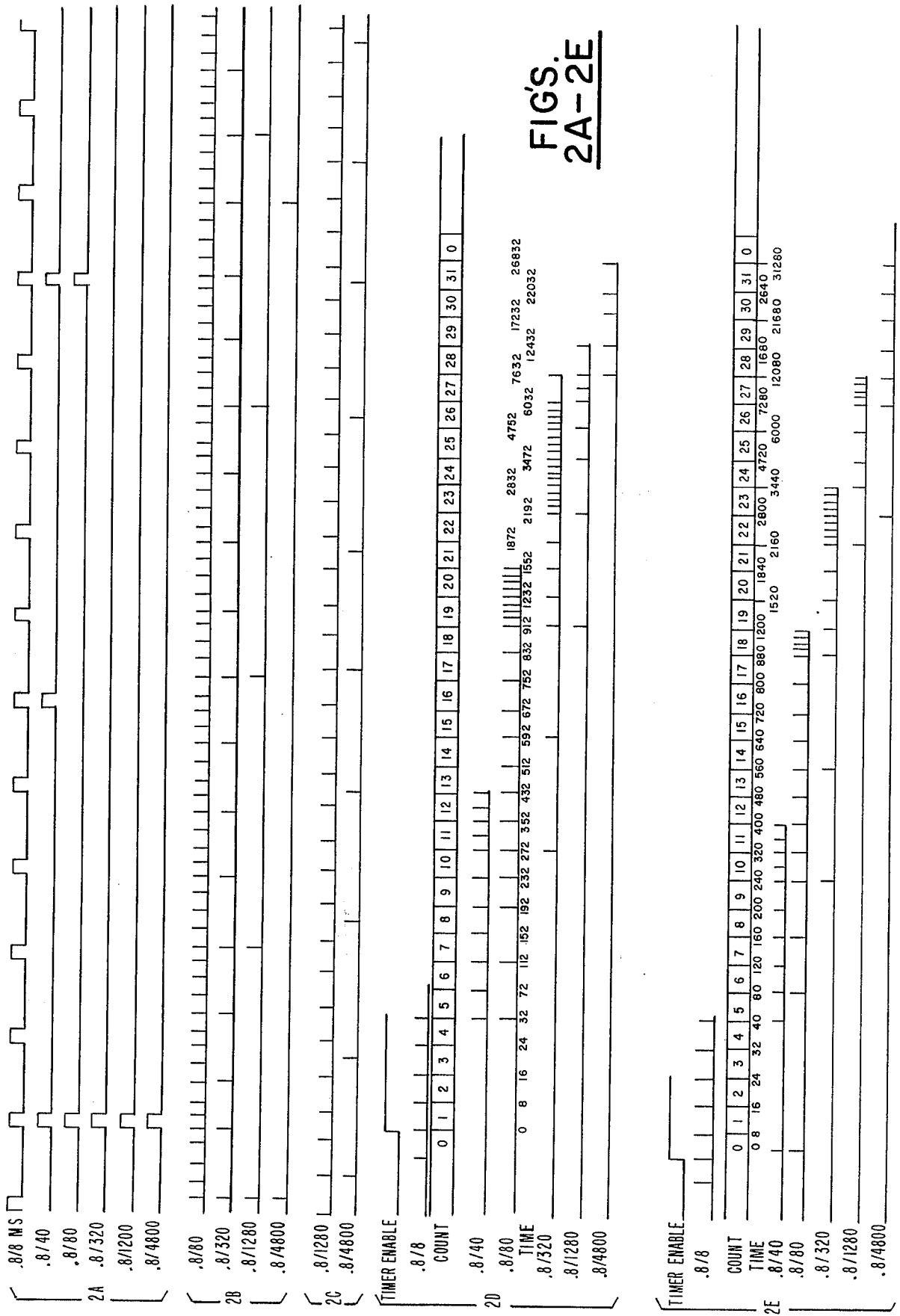
FIGS. 2a – 2e are timing diagrams for illustrating the operation of the timer depicted in FIG. 1.

The timing relationships between these clock signals are illustrated in FIGS. 2a – 2c.

The outputs of the NAND gates G1 – G5 are connected to the inputs of gates G6 – G10, the output of gate G1 also being connected to the A < B input of comparator C1. Each comparator receives a plurality of inputs from the outputs of gates G6 – G10 in order to compare the code received from the code register with a code preset for each comparator and supplied to the B inputs thereof, which are connected to one of two potential lines for establishing the desired count employed s the standard by each respective comparator. Thus, comparator C1 will continue to provide an output on line 10 as long as the code supplied over lines I1 – I5 is less than 5, the standard for comparator C1. This will provide an enabling input to the other input of NAND gate G28 which receives the 8 ms clock signal.

In like manner, comparators C2 – C5 will provide appropriate outputs at the respective output lines 20 – 50 as long as the timing code received on input lines I1 – I5 is less than counts 10 – 27, respectively. When the code inputs on lines I1 – I5 correspond exactly to the comparison standards of respective comparators C2 – C5, enabling outputs are provided over lines 21 – 51 to gates G24, G35, G23 and G20, respectively. Moreover, when the count exceeds the highest count standard set in the comparator arrangements, namely 27 for comparator C5, an output is provided over line 52 to provide enabling inputs to gates G34 and G25.

The outputs of gates G6 – G10, which provide the bits to be compared in the respective comparators C1 – C5, are also connected to an incrementing circuit made up of an adder A1 and gates G11 – G13. This incrementor circuit receives the five bit code and will add a digital one to the code whenever a pulse is received at input C0. The incremented code is then provided at the respective inputs of gates G14 – G18. Upon receipt of a timer enable signal, corresponding to the respective time slot for the time code of interest, the new code is passed through AND gates G14 – G18 to the code register over lines 01 – 05, respectively. The gates G10 – G27 are coupled to provide output signals when the timing code reaches the prescribed counts indicated beneath the output lines connected to the gates, correspondig to periods of time from 8 ms up to 30 seconds. When the timer enable signal is maintained at the inhibit level at the time of updating the code register, the code is cleared to all zeros.

In operation, from a plurality of clock source inputs I6 – I11, the timer shown in FIG. 1 continuously receives clock signals of differing constant frequencies at the respective inputs of the gates G28 – G34, as discussed previously. Now, considering a respective time slot in a multiplexed code wherein a timing code is received from a code register over inputs I1 – I5 let it be assumed that the timing operation has just been initiated so that the timing code is a zero, there being a zero bit for each of the five bits on lines I1 – I5. This five bit code, representative of a zero count, will be supplied to the incrementor circuit and will also be supplied to comparator C1. Since the code value is less than 5, comparator C1 will supply an output on line 10 enabling gate G28 to provide an output coupled through gate G40, over line 60, to increment the code by one. Simultaneously, of course, each of the other comparators C2 – C5 makes a comparison and determines that the timing code 00000 is less than its own standard so as to provide an enabling output over lines 20 – 50, respectively. Since, however, the comparison operations of comparators C1 – C5 take place simultaneously, the overlapping of incrementing signals at the outputs of gates G28 – G34 presents no problem and the incrementor circuit is incremented by a count of one. The five bit counting code has now been changed from 00000 to 00001 and in response to a timer enable signal (TMO) being supplied to the other inputs of gates G14 – G18, the new code is supplied to the code register.

For control purposes, control gating circuitry, shown as a gate G40 may be connected between the outputs of the gates G28 – G34 for coupling the increment signal over line 60, in response to appropriate control inputs. In a time shared system, as in the above-referred to electronic private automatic branch exchange telephone system, appropriate common control signals, providing this gating, are supplied.

As the new code 00001 is recycled from the code register to I1 – I5, the count will again be incremented after a period of 8 ms since it is less than the value of 5, corresponding to a digital code of 00101 for comparator C1. Thus, a new code 00010 will be supplied from gates G14 – G18 to the code register. As the code is recycled from the code register, it will be incremented every 8 ms until the value of the code reaches the level established for comparator C1. At this time, there will no longer be an output over line 10, so that gate G28 is disabled and, as a result, the incrementor circuitry will increment the code by a zero rather than add a one to it so that the same count code will be supplied over lines 01 – 05.

Eventually, however, the 40 ms clock signal will enable one of the inputs to gate G29, so that 40 milliseconds after the code has been advanced to 5, it will be advanced to a count of 6 and the digital code 00110 will be supplied over an output line 05 – 01 to the code register. As the code is recycled, comparator C2 will cause the code to be updated every 40 milliseconds, by way of gate G29 and the 40 millisecond clock input over line 17, until the count reaches a count of 10 as established by comparator C2.

This non-linear incrementation is shown in FIG. 2e, wherein the count is increased every 8 ms until a count of 5 is reached and then the 40 millisecond clock pulses cause the count to be incremented only once every 40 ms. When the comparator C2 provides an output indicating that the count of 10 has been reached, since both gates G28 and G29 are now disabled, the count will be incremented once every 80 ms by comparator C3 and gate G30 until a count of 18 is reached. Similar count incrementations are effected by comparators C4 and C5 and gates G31 and G32 until a count of 27 is reached. When the count reaches a count of 27, gate G33 is enabled, and for counts greater than counts of 27, gate G34 is enabled to increment the code once every 4800 ms (approximately every 5 seconds). Once the code reaches a value where all the bits are one, i.e., 11111, the next five second incrementation will reset the bits to zero after a lapse of time of 31,280 ms, namely, slightly more than 30 seconds.

FIG. 2d illustrates a timing diagram for the code incrementation for a minimum time delay, this code being tabulated in Table 1 below.

TABLE 1

| Timer Code (025-029) | Elapsed Time (MS) | |
|---|---|---|
| 0 | 0-8 | |
| 1 | 0-8 | |
| 2 | 8-16 | (8 MS) |
| 3 | 16-24 | (20 MS) |
| 4 | 24-32 | |
| 5 | 32-40 | |
| 6 | 40-88 | DGT |
| 7 | 88-120 | Time |
| 8 | 120-160 | |
| 9 | 160-200 | |
| 10 | 200-248 | (200 MS) |
| 11 | 216-296 | |
| 12 | 296-376 | |
| 13 | 376-456 | |
| 14 | 456-536 | |
| 15 | 536-616 | |
| 16 | 616-696 | |
| 17 | 696-776 | |
| 18 | 776-856 | (800 MS) |
| 19 | 856-1176 | |
| 20 | 1176-1496 | |
| 21 | 1496-1816 | (1.5 SEC) |
| 22 | 1816-2136 | (2 SEC) |
| 23 | 2136-3416 | |
| 24 | 3416-4696 | |
| 25 | 4696-5976 | (5 SEC) |
| 26 | 5976-7256 | |
| 27 | 7256-8536 | (8 SEC) |
| 28 | 8536-13336 | |
| 29 | 13336-18136 | (15 SEC) |
| 30 | 18136-22936 | |
| 31 | 22936-27736 | |
| 0 | 27736-32536 | (30 SEC) |

In addition to the incrementation of the code, individual gates such as gates G19–G27 may be provided for providing outputs at a respective code values, to provide control signals at desired periods of time after the initiation of the count. Of course, the timing signals can be appropriately selected in dependence upon the value of the code desired and, accordingly, the lapse of time intended. Those illustrated are for timing counts ranging from 2 to 32, i.e. lapses of time from 8 ms up to 30 seconds.

Figure 3:
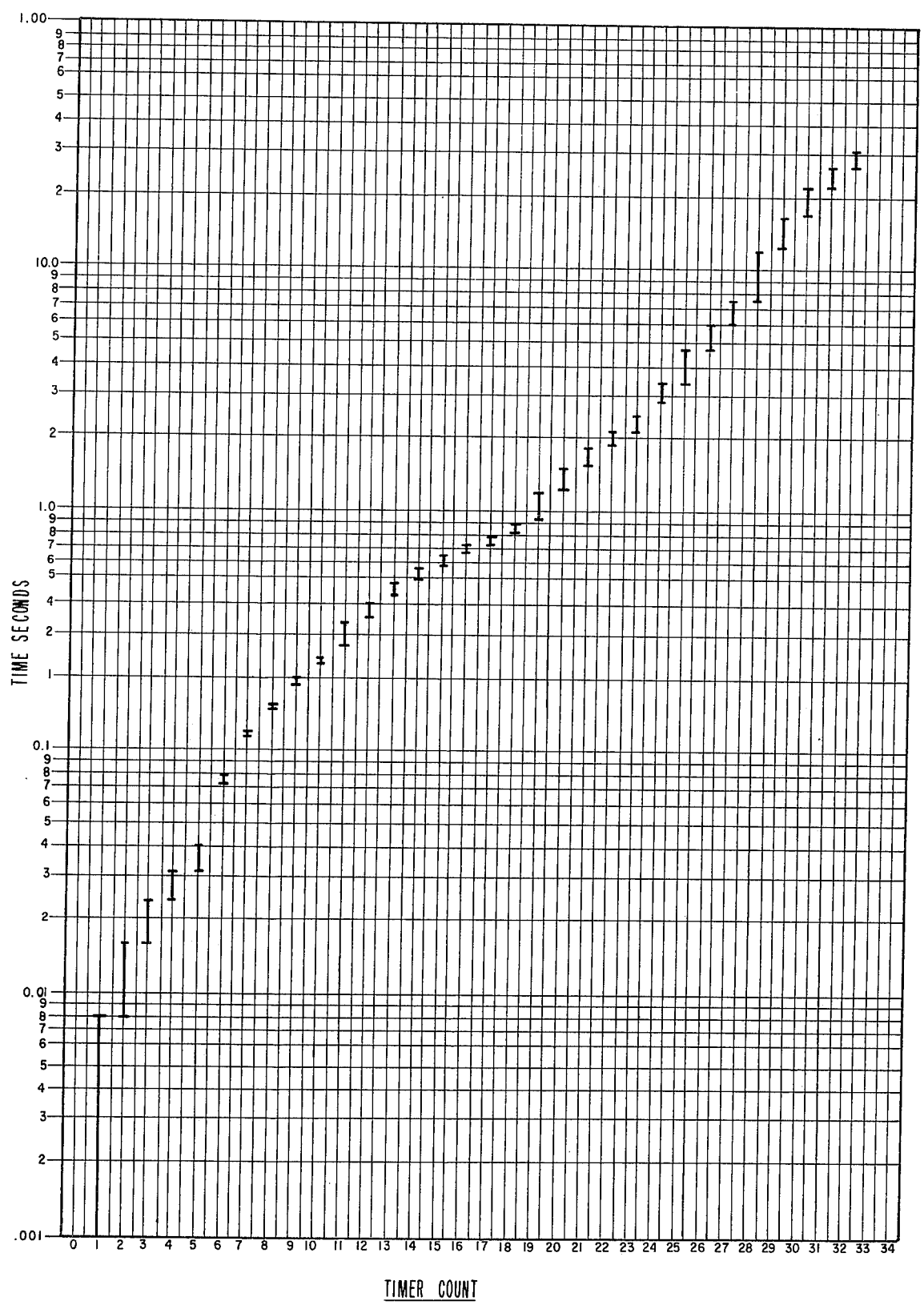
FIG. 3 is a graph depicting the precent resolution provided in accordance with the present invention.

FIG. 3 graphically illustrates a substantially constant percent resolution over the entire timer count, as the code is incremented logarithmically in a stepwise manner in accordance with the counts established for each of the comparators.

As was mentioned previously, depending upon the number of bits which define the count, while illustrated as 5 in the example given, is not limited thereto but any desired number may be chosen without departing from the essence of the invention. Also, the number of comparators may be selected as desired. The values of 5, 10, 18, 22 and 27 for comparators C1–C5 are especially adapted for use with the above-discussed electronic private automatic branch exchange telephone system.

While we have shown and described an embodiment in accordance with the present invention, it is understood that the same is not limited thereto but is susceptible of numerous changes and modifications as known to a person skilled in the art and We therefore do not wish to be limited to the details shown and described herein but intended to cover all such changes and modifications as are obvious to one of ordinary skill in the art.

We claim:

1. A timer apparatus comprising:
   first means for receiving a first signal representative of a prescribed timing code; and
   second means, coupled to said first means, for incrementing said timing code to produce a second signal representative thereof in accordance with a predetermined clock rate, the instantaneous frequency of which clock rate is determined by the time code value represented by said first signal.

2. A timer apparatus according to claim 1, wherein said first signal is a digital signal made up of a prescribed number of bits, and wherein said second means includes means for modifying said first signal, in accordance with a preselected digital signal, in dependence upon the coded value of said prescribed number of bits.

3. A timer apparatus according to claim 1, wherein said second means includes:
   means for receiving a plurality of clock signals, each of which is produced at a respectively different clock frequency, and
   means for incrementing said timing code, to produce said second signal, at one of said different clock frequencies determined by the time code value represented by said first signal.

4. A timer apparatus according to claim 1, wherein said first signal is a digital signal made up of a prescribed number of bits, and wherein said second means includes
   means for receiving a plurality of clock signals, each of which is produced at a respectively different clock frequency, and
   means for modifying said first signal, at one of said different clock frequencies, in accordance with a preselected digital signal, in dependence upon the coded value of said prescribed number of bits.

5. A timer apparatus according to claim 4, wherein said modifying means includes means for adding said preselected digital signal representative of a selected digital code to said first signal at a rate corresponding to said one of said different clock frequencies.

6. A timer apparatus according to claim 5, wherein said modifying means further includes
   at least one comparator, coupled to said first means, for comparing the time code value represented by said first signal with a prescribed code, and
   at least one gating circuit, coupled to said at least one comparator and coupled to receive one of said plurality of clock signals, for controlling the rate at which said adding means adds said preselected digital signal to said first signal in dependence upon whether the time code value represented by said first signal is less than said prescribed code value.

7. A timer apparatus according to claim 6, wherein said at least one comparator and said at least one gating circuit comprises a plurality of comparators and a plurality of gating circuits, respectively, each of which is associated with a different one of said clock signals.

8. A timer apparatus according to claim 7, wherein each of said gating circuits is coupled to gate a respective clock signal to said adding means as long as the time code value represented by said first signal is less than the prescribed code value for the comparator coupled to the respective gatingcircuit.

9. A timer apparatus according to claim 8, wherein said modifying means further includes gate circuit means, coupled to the one of said comparators having the highest prescribed code value and coupled to receive the clock signal having the lowest clock frequency, for gating the clock signal having said lowest clock frequency to said adding means to increment said first signal at said lowest clock frequency only in response to the time code value of said first signal being at least equal to said highest prescribed code value.

* * * * *